United States Patent
Marchand et al.

(10) Patent No.: US 7,781,629 B2
(45) Date of Patent: Aug. 24, 2010

(54) METHODS OF HYDROTREATING A MIXTURE MADE UP OF OILS OF ANIMAL OR VEGETABLE ORIGIN AND OF PETROLEUM CUTS WITH QUENCH INJECTION OF THE OILS ON THE LAST CATALYST BED

(75) Inventors: Karin Marchand, Lyons (FR); Fabrice Bertoncini, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 408 days.

(21) Appl. No.: 11/962,770

(22) Filed: Dec. 21, 2007

(65) Prior Publication Data
US 2008/0173570 A1    Jul. 24, 2008

(30) Foreign Application Priority Data
Dec. 22, 2006    (FR)  ................... 06 11408

(51) Int. Cl.
*C07C 1/00*      (2006.01)
*C10G 25/00*      (2006.01)

(52) U.S. Cl. ............... 585/240; 208/58; 208/113; 208/208 R; 208/213

(58) Field of Classification Search ......... 585/240; 208/58, 113, 208 R, 213
See application file for complete search history.

(56) References Cited

U.S. PATENT DOCUMENTS

| 5,110,444 A | 5/1992 | Haun |
| 6,702,935 B2 * | 3/2004 | Cash et al. ............ 208/58 |
| 7,626,063 B2 * | 12/2009 | Ghonasgi et al. ...... 585/276 |
| 2006/0118466 A1 * | 6/2006 | Galeazzi et al. ....... 208/210 |

FOREIGN PATENT DOCUMENTS

| EP | 1396531 A2 | 3/2004 |
| EP | 1681337 A | 7/2006 |
| EP | 1693432 A | 8/2006 |
| WO | WO 03/044131 A | 5/2003 |

* cited by examiner

*Primary Examiner*—N. Bhat
(74) *Attorney, Agent, or Firm*—Millen, White, Zelano & Branigan, P.C.

(57) ABSTRACT

A hydrotreating method uses two catalyst beds with the introduction, on the last catalyst bed, of oils of animal or vegetable origin for co-treating a mixture made up of oils of vegetable or animal origin and of petroleum cuts (gas oil cuts (GO) and middle distillates) in order to produce gas oil effluents meeting specifications with an improved cetane number. The first catalyst bed is dedicated to only the deep desulfurization reactions (HDS1) of a petroleum type feed. The effluents of the first catalyst bed having an effluent sulfur content below or equal to 50 mg/kg are separated into two streams. The first stream, which is predominant, is sent to the gas oil pool. The second stream is mixed with oils of vegetable or animal origin. The resultant oil-petroleum cut mixture is then subjected to a milder hydrotreatment (HDT2). The effluents obtained at the outlet of the second catalyst bed can optionally be mixed with the predominant stream from the first bed. The process economy, the tolerance to the specifications relative to oils of animal or vegetable origin and the quality of the products obtained are thus greatly improved.

18 Claims, 1 Drawing Sheet

METHODS OF HYDROTREATING A MIXTURE MADE UP OF OILS OF ANIMAL OR VEGETABLE ORIGIN AND OF PETROLEUM CUTS WITH QUENCH INJECTION OF THE OILS ON THE LAST CATALYST BED

FIELD OF THE INVENTION

Cross Reference to Related Application

This application is related to our concurrently filed application entitled "Methods Of Hydrotreating A Mixture Made Up Of Oils Of Animal Or Vegetable Origin And Of Petroleum Cuts With Intermediate Stripping", Ser. No. 11/962,760 claiming priority of French application FR 06/11409 filed Dec. 12, 2006.

The present invention relates to methods of hydrotreating a feed made up of a mixture of oils of vegetable or animal origin and of petroleum feeds intended to produce gas oil fuel bases.

BACKGROUND OF THE INVENTION

In an international context characterized by a fast growth in fuel requirements, in particular gas oil bases in the European community, the search for new renewable energy sources that can be integrated in the conventional refining and fuel production scheme is a major challenge.

In this respect, integration in the refining process of new products of vegetable or animal origin, resulting from the conversion of lignocellulosic biomass or from the production of vegetable oils or animal fat, has known renewed interest as a result of the increase in the cost of fossil materials. Similarly, conventional biofuels (ethanol or vegetable oil methyl esters mainly) have acquired the status of complement to petroleum type fuels in gasoline pools. Furthermore, the processes known to date that use vegetable oils or animal fat are the cause of significant $CO_2$ emissions, known for their negative effects on the environment. A better use of these bioresources, such as their integration in the gasoline pool, would therefore be of great advantage.

The production of fuel bases is more and more identified as a new attractive outlet by the agricultural world, in particular by vegetable oil producers, these oils resulting from the crushing of oilseed such as rape, soybean or sunflower. In fact, these vegetable oils consist of fatty acids in form of triglycerides, with long alkyl chains whose structure corresponds to the normal paraffins of gas oil cuts (chain length from 12 to 24 carbon atoms, depending on the nature of the vegetable oil). Unsuitable for directly feeding modern diesel engines, these vegetable oils first have to be converted.

One existing approach is based on the reaction of transesterification with an alcohol such as methanol, leading to vegetable oil methyl esters (VOME) commonly referred to as biodiesel. This option is now widely used in Europe since the production of VOME has increased very significantly during the past ten years, thus reaching 1.5 Mt in 2003 (the average yearly growth rate is 35% between 1992 and 2003). This production is notably supported by the European directive on the promotion of biofuels (2003/30/CE) that sets increasing biofuel consumption objectives in the field of transport. These consumptions will have to be at the minimum 2% in 2005, 5.75% in 2010 and 8% (percentages measured in energy) in 2015 of the overall consumption of gasoline and gas oil used for transport. However, this type of process is relatively expensive and it requires vegetable oil type limitations in order to meet the biodiesel specifications. Besides, the feeds for this type of process must be carefully selected, so that a certain number of vegetable oils cannot be treated in this manner. Finally, the cold properties of these products also represent a limiting factor.

Another approach consists in directly using vegetable oils via their conversion to elementary fatty acid derivatives, by means of hydrorefining or hydroconversion processes whose catalysts are also known to the person skilled in the art for their hydrodeoxygenation properties [E. Laurent, B. Delmon, Appl. Catal. A 109 (1) 1994 77-96 and 97-115]. In this case, the triglycerides are converted to mainly paraffinic and saturated derivatives, thus forming excellent bases for the gas oil pool considering their good cetane numbers.

There is therefore a strong need of the petroleum refining industry to treat oils of vegetable or animal origin, if possible at a lower cost and while taking account of the existing plants.

Several patents cover these fields of interest.

U.S. Pat. No. 5,233,109 describes the implementation of thermal or catalytic cracking of vegetable oils leading to a wide range of products such as paraffins, but also aromatic derivatives and unsaturated derivatives in the boiling range of gasolines and gas oils. This method produces derivatives that cannot be directly used as gas oil fuel bases and it is particularly penalizing as regards meeting standard specifications (oxidation stability).

U.S. Pat. Nos. 4,992,605 and 5,705,722 describe methods of producing bases for the gas oil pool produced from direct conversion of vegetable oils (rape, palm, soybean, sunflower) or of lignocellulosic biomass to saturated hydrocarbons after hydrotreatment or hydrorefining of these products alone.

The conversion methods described are operated at pressures ranging between 0.48 and 1.52 MPa and at temperatures ranging between 350° C. and 450° C. allowing to obtain products with a high cetane number. The pro-cetane additives thus obtained are mixed with the gas oil in proportions of 5 to 30% by volume.

Furthermore, these two patents have the major drawback of a high hydrogen consumption essentially due to the unsaturations present in the feeds consisting of vegetable oils and to the fact that the oxygen contained in the triglycerides is generally decomposed by hydrodeoxygenation in the presence of a hydrotreating catalyst.

In this respect, patent EP-1,681,337 represents an improvement since it provides a method using only small amounts of hydrogen. It is a decarboxylation/decarbonylation method on group VIII catalysts first reduced to a temperature ranging between 100° C. and 500° C. The reactions are then carried out at a temperature ranging between 200° C. and 400° C. at a pressure ranging between 1 and 15 MPa. In this case, the decarboxylation/decarbonylation reaction produces saturated hydrocarbons and $CO_2$ or CO respectively. Hydrogen is no longer necessary, except for keeping the catalytic phase in metallic form and/or for preserving the catalyst from too fast a deactivation.

Besides, operating at such temperatures increases the risks of polymerization of the vegetable or animal feeds containing many unsaturations, which leads to the formation of solid particles causing operability problems for fixed-bed plants.

The products formed by means of this method are not directly used as fuel bases because of very poor cold properties.

In order to overcome these limitations on the cold properties, other patents describe a sequence of a stage of hydrogenation and isomerization of vegetable oils so as to obtain a mixture of branched saturated hydrocarbons whose cold properties are known to be higher than those of the same compounds, but non-branched. Patent FI-100,248 relates to the hydrogenation of fatty acids or triglycerides to n-paraffins, followed by an isomerization stage. Patent EP-1,396,531 describes a hydrotreating method for carrying out hydrodeoxygenation under a pressure of 5 to 10 MPa and at a temperature of 300° C. to 500° C., followed by an isomerization stage at a pressure of 2 to 10 MPa and a temperature of 300° C. to 400° C. The operating temperatures are critical as regards the operability risks linked with the degradation of vegetable oils.

Finally, patent EP-1,693,432 describes a method allowing hydroconversion of a mixture of vegetable oils (1% to 75% by volume) and of hydrocarbons (99% to 25% by volume) in a single hydrotreating reactor, at a pressure of 4 MPa to 10 MPa, with a NiMo or CoMo type catalytic bed operated at a temperature ranging between 320° C. and 400° C. The advantage of this approach is the gain in terms of cetane number and of density decrease provided by mixing with the vegetable oil in relation to the properties obtained by direct treatment of the petroleum base. Furthermore, mixing hydrocarbon feeds with vegetable oils allows to improve the cold properties of the effluents obtained in comparison with those that would be obtained by treating the vegetable oils alone. The hydrotreating catalysts used are group VIB transition metal sulfides promoted by group VIII metals. The presence of compounds from non-desulfurized petroleum cuts allows to obtain a higher $H_2S$ partial pressure than the minimum partial pressure necessary for the catalyst stability.

This method however involves several drawbacks. The first drawback lies in the implementation of a single stage for co-treating the vegetable oil and the petroleum base. In fact, this is limiting as regards optimum operation of hydrotreating catalysts intended to operate the decarboxylation-decarbonylation, hydrodeoxygenation and hydrodesulfurization reactions simultaneously. Now, the operating conditions allowing to promote the decarboxylation and decarbonylation reactions, and thus to obtain a hydrogen consumption reduction in relation to hydrodeoxygenation are milder than those required to obtain the desired effluent sulfur specifications. The activity and the stability of the catalyst as used in this patent are penalized because of the formation of the coproducts of the hydrodeoxygenation and decarboxylation and/or decarbonylation reactions, i.e. water and CO and/or $CO_2$. These molecules are in fact well known to the person skilled in the art for their deactivation and inhibition effects respectively on hydrotreating catalysts (US-2003/0,221,994). It would therefore be interesting to be able to do without these coproducts so as to allow a better catalyst activity while limiting the presence of inhibitors and to obtain a longer cycle time of the plant (catalyst stability while limiting the harmful effects due to the presence of water). Co-treatment of the petroleum base and of the vegetable oil thus leads to fast catalyst aging and to a degradation of the hydrodesulfurization performances of the catalysts. In particular, this patent does not mention hydrodesulfurization performances of the process or the quality of the products formed in relation to all the standard specifications for gas oil fuels. Considering the cost of the loading and unloading operations, as well as the cost of the raw material for the catalysts and recycling thereof, it is important for refiners to maximize the cycle time of the plant and consequently the life of the hydrotreating catalyst allowing to obtain gas oils meeting specifications.

Finally, the orientation of the vegetable oil conversion mechanism (hydrodeoxygenation or decarboxylation/decarbonylation) is difficult under the operating conditions required to carry out hydrodesulfurization of the gas oil base. Now, this selection is very important in terms of hydrogen consumption. In fact, it is not unknown to the person skilled in the art that the hydrogen consumption remains a critical parameter, considering its low availability in refineries. It is therefore important to minimize its consumption. The fact that the optimum operating conditions differ for the desired reactions is thus greatly limiting in the case of co-treatment of vegetable and petroleum oils carried out in a single stage.

The second drawback of this method lies in the heating procedure for the vegetable oil prior to feeding it into the mixer, then into the hydrotreating plant proper. In fact, it is known to the person skilled in the art that the temperature rise (>150° C.) of vegetable oils greatly favours the formation of gum or of heavy polymers through thermal degradation or thermo-oxidation of a vegetable oil (A. Rossignol-Castera. "*La thermo-oxydation des huiles végétales*" Institut des corps gras ITERG-2006). This phenomenon is intensified by the presence of unsaturations of the fatty acids and of traces of metals (such as Cu, Fe, Zn, Al). These reactions mainly produce polymers of triglycerides or previously oxidized triglycerides, either by formation of epoxide bridges or by oligomerization of the double bonds (radical mechanism) (J. L. PERRIN et coll. "*Etude analytique profonde d'huiles chauffées—Techniques analytiques et essais préliminaires*" Revue francaise des corps gras, 1992, vol. 32, N°4, p. 151-158). These compounds may hinder the progress of the process because they are likely to clog the reactor or to generate unwanted degradation products.

Besides, other compounds present in minor proportions in the vegetable oils (case of phospholipides, proportion typically below 1%) are likely to generate under temperature gels inducing pressure drops during the course of the process. The fact that the heating and operating conditions described in this patent are severe can lead to vegetable oil degradations harmful to the smooth running of the plant (clogging, pressure drop, operability).

There is therefore an industrial and environmental need to improve the co-treatment conditions of mixtures of oils of vegetable or animal origin and of petroleum bases in order to produce gas oil fuels.

The use of two catalyst beds with intermediate separation is well known to the person skilled in the art. When all of the effluent from the first bed is sent after stripping to the second one, an integrated process can be used as described in document U.S. Pat. No. 5,110,444. When a part only of the effluent of the first bed is sent to the second, another type of integrated process has been described in patent application WO-2003/044,131A1. In these processes, the second catalyst bed is used as a finishing bed for deepening the conversion of the sulfur, nitrogen or aromatic compounds performed in the first bed. Thus, addition in admixture with the effluents of the first catalytic section, which furthermore generates quenching, of a stream external to the process requiring in the second bed a new type of catalytic reaction that does not occur in the first catalyst bed is not described in these documents.

SUMMARY OF THE INVENTION

The invention relates to a hydrotreating method using two plants (HDS1 and HDT2) in series with (1) a stage of deep hydrodesulfurization of a petroleum cut resulting from distillation or from a conversion plant in order to meet the sulfur content required by standard specifications, (2) introduction between the two catalyst beds of a stream of oils of vegetable or animal origin (1 to 99% by volume) in admixture with part of the effluent from plant HDS1 (99% to 1%), (3) mild hydrotreatment HDT2 in comixture with oil and effluent from HDS1 so as to produce gas oil fuel bases directly meeting specifications, notably in terms of sulfur content (below 50 mg/kg, preferably below 10 mg/kg), density and cold resistance properties.

Each stage can comprise one or more reactors, one or more catalytic zones (or beds), and use identical or different catalysts.

Implementation of the method according to the invention allows to reduce the cost of the treatment of oils of vegetable or animal origin to obtain gas oils meeting the specifications in comparison with a specifically dedicated transesterification type plant, by integrating their treatment in an existing refining scheme with an existing hydrodesulfurization plant (HDS1).

The cost of the treatment of vegetable oils in order to obtain gas oils meeting specifications can also be reduced in relation to a co-treatment scheme in one or two stages because the streams of oil of vegetable or animal origin are small in relation to the streams of middle distillates that can be treated in a standard refinery. The costs of the utilities of the second plant of smaller size than the first are reduced since the oils are only in comixture with a small part of the hydrotreated hydrocarbon stream from the first stage.

The method according to the invention also allows to reduce the cost of the treatment of oils of vegetable or animal origin by incorporating their treatment on the one hand in an existing refining scheme comprising a hydrodesulfurization plant (HDS1), and on the other hand after the prior deep hydrodesulfurization stage, thus avoiding the inhibiting effects generated by the by-products resulting from the conversion of the oils ($CO$, $CO_2$, etc.) in this first plant in relation to a single-stage co-treatment scheme.

The method according to the invention allows to use a wider range of oils of vegetable or animal origin in comparison with existing methods to obtain gas oils meeting specifications, notably without being limited by the low thermal stability or the polymerization problems inherent in the chemical characteristics of these feeds.

The treatment cost of these oils is also minimized by their incorporation in a stream under temperature of effluents coming from the existing hydrodesulfurization plant (HDS1) and under partial hydrogen pressure, while preventing risks of thermal degradation of the vegetable oils in the preheating equipments of the process (polymerization or triglyceride or other vegetable oil constituents thermodegradation side reactions in the exchangers or in the preheat furnaces) in relation to a single-stage co-treatment scheme. In fact, operability problems are often the cause of plant shutdowns, which is economically penalizing.

The method according to the invention allows better thermal stability of the oil through the adjustment of the mixing ratio with the hydrocarbon effluents upon feeding it between the two catalyst beds and the adjustment of the partial hydrogen pressure. Heating of the oils of vegetable or animal origin is directly performed by heat transfer between the effluents of the first plant and the oils introduced before the second reaction section.

The activity of the catalyst used for hydrotreating the distillates used in hydrodesulfurization plant (HDS1) is improved in relation to a single-stage co-treatment scheme since the oil stream is injected into the second catalyst bed.

Similarly, the activity and the stability of the catalyst used for hydrotreating the oils used in mild hydrotreatment plant (HDT2) are also improved in relation to a single-stage co-treatment scheme by means of operating conditions (temperature notably) allowing to orient the most favourable conversion scheme in terms of hydrogen consumption and limiting cracking or thermal degradation of the triglycerides by adjusting the operating temperature of the second bed.

The hydrogen consumption can also be limited by using partly or totally the recycle hydrogen from the first reaction section for the second one. Besides, it is not necessary to use hydrogen under pressure to limit the exothermy of the first reaction section since quenching is going to be provided by the vegetable oils.

DETAILED DESCRIPTION

Figure 1:
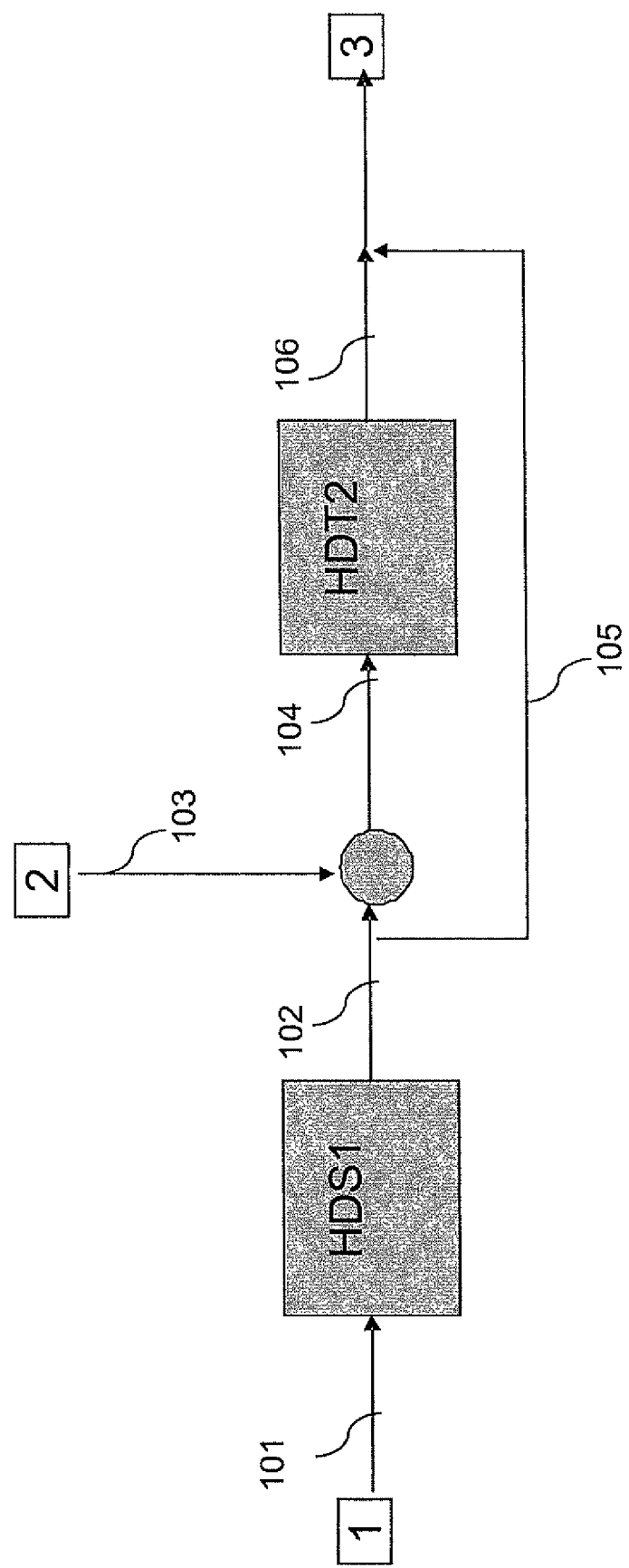
FIG. 1 shows a process layout according to the invention.

The method according to the present invention is a hydrotreating process using two plants (HDS1 and HDT2) in series with (1) a stage of deep hydrodesulfurization of a petroleum cut resulting from distillation or from a conversion plant in order to meet the sulfur content required by standard specifications, (2) quench introduction between the two catalyst beds of a stream of oils of vegetable or animal origin (1 to 99% by volume) so as to constitute a mixture with part of the effluent from plant HDS1 (99% to 1%), (3) mild hydrotreatment HDT2 in comixture with oil and effluent from HDS1 so as to produce gas oil fuel bases directly meeting specifications, notably in terms of sulfur content (below 50 mg/kg, preferably below 10 mg/kg), density and cold resistance properties.

Advantageously, the mixture consists of 1 to 50% oils of animal or vegetable origin and of 99 to 50% petroleum bases.

During hydrotreatment (HDT), the reactions undergone by the feed are as follows:
  the decarbonylation reaction represents all of the reactions allowing to remove an oxygen and a carbon from a carboxylic group by forming carbon monoxide,
  the decarboxylation reaction represents all of the reactions allowing to remove a carboxyl group from a carboxylic group by forming carbon dioxide,
  the hydrodeoxygenation reaction corresponds to the reactions leading to the formation of water in the presence of hydrogen.

What is referred to as hydrodesulfurization (HDS) are the reactions allowing to remove the sulfur from the petroleum feed with production of $H_2S$.

What is referred to as denitrogenation (HDN) are the reactions allowing to remove the nitrogen from the petroleum feed with production of $NH_3$.

Each stage can comprise one or more reactors, one or more catalytic zones (or beds), and use identical or different catalysts. It is thus possible to adjust the treating conditions in each plant and/or zone.

Quench introduction of vegetable oil at the top of the second catalyst bed allows to avoid the presence of carbon monoxide (CO), of carbon dioxide ($CO_2$) and of water ($H_2O$) resulting from hydrotreatment of the triglycerides that make up the oil on the first catalytic bed during the petroleum cut deep desulfurization stage (HDS1). These compounds being known for their deactivation and/or inhibition effects, this allows to obtain a better activity of the HDS1 catalyst. Quench introduction of the oil of vegetable or animal origin thus allows not to penalize the activity and the stability of the catalyst of plant HDS1 in this respect and to obtain an effluent sulfur content close to the required specifications.

Quench introduction allows to facilitate all the more second stage as the stripping linked with the separation into two distinct streams allows to eliminate the hydrogen sulfide ($H_2S$) and the ammonia ($NH_3$) linked with the reactions of hydrodesulfurization, hydrogenation and hydrodenitrogenation of the compounds belonging to the petroleum cut.

Hydrotreatment of the oil/petroleum cut mixture is carried out at a lower temperature, and even at a lower pressure than in the case where the two catalytic sections consist of two distinct plants.

In particular, thanks to the method according to the invention, it becomes possible to choose the orientation of the oil conversion mechanism during second stage HDT2: hydrodeoxygenation or decarboxylation/decarbonylation option.

It is therefore advantageous to use the petroleum cut streams to introduce the stream of oils of vegetable or animal origin by diluting them on the one hand and, on the other hand, bringing these streams under partial pressure with hydrogen can allow to inhibit polymerization or radical coupling phenomena.

The feeds used on the one hand consist of fatty matter and therefore correspond to a natural or elaborate substance of animal or vegetable origin, mainly containing triglycerides. This essentially involves oils from renewable resources such as fats and oils from vegetable and animal resources (such as lard, tallow, fowl fat, bone fat, fish oil and fat of dairy origin), as well as the compounds and the mixtures derived therefrom, such as fatty acids or fatty acid alkyl esters. The products resulting from recycling of animal fat and of vegetable oils from the food processing industry can also be used, pure or in admixture with other constituent classes described above.

The preferred feeds are vegetable oils from oilseed such as rape, erucic rape, soybean, sunflower, palm, copra; palm-nut, arachidic, olive, corn, cocoa butter, nut, linseed oil or oil from any other vegetable. These vegetable oils very predominantly consist of fatty acids in form of triglycerides (generally above 97% by weight) having long alkyl chains ranging from 8 to 24 carbon atoms, such as butyric fatty acid, caproic, caprylic, capric, lauric, myristic, palmitic, palmitoleic, stearic, oleic, linoleic, linolenic, arachidic, gadoleic, eicosapentaenoic (EPA), behenic, erucic, docosahexaeoic (DHA) and lignoceric acids.

The fatty acid salt, fatty acid alkyl ester and free fatty acid derivatives that can be produced by hydrolysis, by fractionation or by transesterification for example of triglycerides or of mixtures of these oils and of their derivatives also come into the definition of the "oil of vegetable or animal origin" feed in the sense of the present invention.

The feeds that are particularly preferred are vegetable rape oil, erucic rape, soybean, sunflower or oleic sunflower oils (predominantly C18 fatty acids), palm oils (predominantly C16 fatty acids), copra and palm-nut oils (predominantly C12-C14 fatty acids), or mixtures of these oils and of their derivatives.

On the other hand, the typical hydrocarbon feed of the method according to the invention is a middle distillate feed. In the sense of the present description, the term middle distillate designates hydrocarbon fractions whose boiling point temperature ranges between about 130° C. and about 410° C., generally between about 140° C. and about 375° C. and, for example, between about 150° C. and about 370° C. A middle distillate feed can also comprise a gas oil or diesel cut, or it can be referred to by one of these designations. Straight-run gas oils or gas oils obtained from catalytic cracking (LCO) or from any other conversion process (coking, visbreaking, residue hydroconversion, . . . ) constitute a part of the typical feeds of the method according to the invention.

Operating Conditions

First Catalytic Section: Deep Hydrodesulfurization

The operating conditions that can be applied in these processes are usually as follows: temperature ranging from 180° C. to 450° C. (preferably between 250° C. and 440° C.), total pressure from 0.5 to 30 MPa (preferably between 1 and 25 MPa), an hourly space velocity from 0.1 to 20 $h^{-1}$ (preferably between 0.2 and 4 $h^{-1}$), a hydrogen/feed ratio expressed in volume of hydrogen, measured under the normal temperature and pressure conditions, per volume of liquid feed generally ranging from 50 Nl/l to 2000 Nl/l.

Second Catalytic Section: Mild Hydroconversion of Oils of Vegetable or Animal Origin in Comixture with Petroleum Oil The operating conditions that can be applied in these processes are as follows: temperature ranging from 180° C. to 360° C. (preferably from 190° C. to 350° C.), total pressure from 0.5 to 20 MPa (preferably between 1 and 10 MPa), an hourly space velocity from 0.1 to 20 $h^{-1}$ (preferably between 0.2 and 5 $h^{-1}$), a hydrogen/feed ratio expressed in volume of hydrogen, measured under the normal temperature and pressure conditions, per volume of liquid feed generally ranging from 50 Nl/l to 2000 Nl/l. This hydrogen can possibly consist in a proportion ranging from 100 to 1% by volume of the recycle hydrogen from plant HDS1.

Preheating of the feed containing at least the hydrocarbon feed can be carried out by any means known to the person skilled in the art. Without limiting the scope of the invention, the use of heat exchangers and/or of preheat furnaces can be mentioned by way of example.

The vegetable or animal oil and the hydrotreated effluent from the first catalytic section can be mixed at various points of the process layout.

One possibility consists in injecting the vegetable oil after passage through a feed-effluent exchanger of plant HDS1, then in mixing before or after separation of the stream from HDS1 into two streams. In this case, the operating conditions of the stripping of the effluents of HDS1 must be adapted according to methods known to the person skilled in the art.

The oils of vegetable or animal origin are incorporated in at least part of the effluent from the hydrodesulfurization plant under partial hydrogen pressure, the hydrogen being make-up hydrogen and/or recycle hydrogen from the first catalytic section.

Heating of the oils is directly performed by heat transfer between the effluents of the first plant and said oils introduced before the last catalyst bed in the presence of hydrogen.

An important specification for a diesel fuel mentioned in specification standard EN590 is the cetane number value of 51 according to the ASTM D613 standard, which represents the self-ignition properties of the fuel in the engine running mode.

This parameter very clearly shows the advantage of this method that provides a very appreciable cetane number increase by means of the co-treatment in admixture of a petroleum base and of a vegetable oil, according to the nature of the vegetable oil and of the petroleum base.

The method according to the invention will be described in connection with FIG. 1 representing a process layout. In this diagram, the feed preheating stages are not shown.

The hydrocarbon cut (1) resulting from distillation or from a conversion plant is fed into the deep hydrodesulfurization plant via line (101). The hydrotreated effluent leaving through line (102) is separated into two streams: the major part of the stream (105) is directly sent to the gas oil pool. The other part is mixed with oils of vegetable or animal origin (2) that are quench introduced on the last catalyst bed. The mixture obtained is then sent through line (104) to a mild hydrotreatment plant HDT2. The effluents (106) obtained at the outlet of the last catalyst bed are then mixed with the major stream coming from the first bed and sent to the gas oil pool (3).

Catalysts

The hydrotreating catalysts used within the scope of the invention generally include at least one metal from group VIB and/or at least one metal from group VIII of the periodic table of elements. The commonest formulations are of cobalt-molybdenum (CoMo), nickel-molybdenum (NiMo) and nickel-tungsten (NiW) type.

These catalysts can also be doped by means of compounds such as phosphorus, boron and/or fluorine. They can come in massive form or in the supported state. In the latter case, the porous matrix is generally an amorphous, poorly crystallized or even crystallized oxide, possibly associated with a zeolitic or non zeolitic molecular sieve.

By way of example, without limiting the scope of the invention, the supports known to the person skilled in the art are typically alumina, silica alumina, titanium oxide.

After preparation, said catalysts often come in form of an oxy-hydroxide or an oxide depending on whether the catalyst used is a dried catalyst (volatile content >15% by weight for a temperature of 550° C.) or a calcined catalyst (volatile content ≦15% by weight for a temperature of 550° C.).

Their active and stable form for hydrotreating processes being the sulfur form, these catalysts must undergo a sulfurization stage. This stage can be carried out in the hydrotreating plant itself (in-situ sulfurization) or prior to feeding the catalyst into the plant (ex-situ sulfurization). The catalysts used in the two catalytic sections can be sulfurized after or before feeding into the plant using any method known to the person skilled in the art, whether gas phase or liquid phase sulfurization by means of a sulfurizing agent incorporated in the feed.

The catalyst is preferably sulfurized in situ in the liquid phase.

EXAMPLES

The following examples clarify the invention without limiting the scope thereof.

Example 1

Single-stage Method of Hydrotreating a Mixture Made Up of Vegetable Oils and of a Petroleum Cut Co-treatment of a mixture made up of a straight-run gas oil and of a rape oil was carried out in a fixed-bed isothermal plant of descending flow type containing 50 cc catalyst of CoMo/Al$_2$O$_3$ type in dense loading.

The petroleum feed used is a straight-run gas oil from a Middle East crude whose characteristics are as follows:

| | |
|---|---|
| Density at 15° C.: | 0.8522 |
| Sulfur: | 1.35% by weight |
| Nitrogen: | 126 mg/kg |
| Simulated distillation: | |
| PI: | 155° C. |
| 10% by weight: | 247° C. |
| 50% by weight: | 315° C. |
| 90% by weight: | 392° C. |
| PF: | 444° C. |

After in-situ sulfurization at 350° C. in the plant under pressure, carried out by adding 2% by weight of dimethylsulfide to the gas oil feed used, hydrotreatment was then performed for 140 h under the following operating conditions:

| | |
|---|---|
| Total pressure (MPa rel): | 4 MPa |
| Temperature (° C.): | 350 |
| H$_2$/HC (Nl/l): | 320 |
| HSV (h$^{-1}$): | 1.6 |

The properties of the effluents obtained are given in Table 1.

The test feed was then modified so as to obtain a mixed feed containing 5% by weight of rape oil. It can be noted that the density of the products is lower than that obtained with a petroleum cut to which no vegetable oil has been added. The sulfur contents of the effluents are also greatly affected by the presence of 5% by weight of rape oil in the hydrocarbon feed since the effluent sulfur content changes from 76 mg/kg to 400 mg/kg. This corresponds to a 13° C. deactivation, which means that in the presence of 5% by weight of rape oil in the feed, the plant should be operated 13° C. higher to have the sulfur content of the effluents of 76 mg/kg. This trend is confirmed when the "rape oil/straight-run gas oil" proportion of the feed is increased. In fact, as shown in Table 1, for 15% by weight of rape oil in the feed, the sulfur content of the effluents is 582 mg/kg, which corresponds to a 16° C. deactivation.

Thus, co-treatment of a straight-run gas oil with a vegetable oil is highly penalizing for the hydrotreating catalyst activity and for the required sulfur specifications.

The same remark applies to the nitrogen contents of the effluents.

Besides, the hydrogen consumption was measured for the co-treatment in a single stage of straight-run gas oil and for a mixture with a variable proportion of rape oil. As can be seen in Table 1, the hydrogen consumption increases by about 35% in relation to the hydrogen consumption for a straight-run gas oil hydrotreatment. This increase is mainly due to the fact that, under these operating conditions, hydrodeoxygenation is favoured in relation to the decarboxylation and/or decarbonylation reactions.

Analysis of the effluent products shows that the co-treatment of straight-run gas oil and of rape oil allows to obtain effluents with a higher cetane number, but limit cold resistance properties in relation to the EN 590 specification for automotive gas oils (in particular for the cold filter-plugging point (CFPP) set at 0° C.). However, these properties are greatly improved in relation to those of the initial vegetable oil (CFPP of about 20° C.) or of the effluent from the hydrotreatment alone of vegetable oil (CFPP of 20° C. also).

In conclusion, the effluents obtained by single-stage co-treatment of a straight-run gas oil with a vegetable oil have high cetane number values but they penalize the gas oil pool on the cold properties specifications, requiring the use of dedicated additives.

Finally, carrying out a turning point with a feed made up of 100% straight-run gas oil allows to measure the catalyst deactivation due to the use of a feed containing rape oil.

As shown in Table 1, the effluent sulfur and nitrogen contents are higher than those obtained initially for this feed. Thus, a deactivation of the order of 5° C. has been measured. The lower performances of the catalyst would thus lead to a fast increase in the operating temperature and eventually to a decrease in the catalyst cycle time in the plant.

TABLE 1

Single-stage hydrotreatment of a mixture of rape oil and of straight-run gas oil

| Feed | Pure straight-run gas oil | Straight-run gas oil in comixture with rape oil (95/5% wt) | Straight-run gas oil in comixture with rape oil (85/15% wt) | Pure straight-run gas oil (return point) |
|---|---|---|---|---|
| Conditions Catalyst age (h) | 140 | 255 | 404 | 517 |
| Density |  |  |  |  |
| feed/effluents (kg/m$^3$) | 853.7/838.0 | 861.1/836.8 | 857.2/834.2 | 853.7/837.8 |
| Sulfur |  |  |  |  |
| feed/effluents (mg/kg) | 13500/76 | 12950/400 | 11967/582 | 13500/162 |
| ΔT HDS (° C.) | Base | −13 | −16 | −5 |
| Nitrogen |  |  |  |  |
| feed/effluents (mg/kg) | 126/13 | 116/32 | 113/37 | 126/19 |
| H$_2$ consumption (% wt/feed) | 0.43 | 0.48 | 0.57 | 0.40 |
| Cetane |  |  |  |  |
| feed/effluent | 56.6/59.2 | 55.6/59.1 | 53.7/60.1 | 56.6/58.8 |
| Cold properties feed/effluent |  |  |  |  |
| Cold filter-plugging point (° C.) | −3/−2 | −3/−2 | +1/+1 | −3/−2 |
| Cloud point (° C.) | +2/+1 | +1/+1 | +1/+1 | +2/+2 |

Example 2

Treatment of the Vegetable Oil Alone

Hydrotreatment of a DNS grade quality rape oil was carried out in an isothermal plant consisting of a fixed bed of descending flow type containing 50 cc catalyst of NiMo/Al$_2$O$_3$ in dense loading.

The characteristics of the straight-run gas oil are identical to those of the gas oil of Example 1. After in-situ sulfurization carried out at 350° C. in the plant under pressure by addition of 2% by weight of dimethyldisulfide to the straight-run gas oil, the feed was modified for a feed consisting of 100% rape oil. The hydrotreatment test was then conducted under the following operating conditions for 150 h:

| Total pressure (MPa rel): | 4 and 2.5 MPa |
| Temperature (° C.): | 320, 300, 280 |
| H$_2$/HC (Nl/l): | 320 |
| HSV (h$^{-1}$): | 1.6 |

The hydrogen consumption and the amount of CO and CO$_2$ formed are shown in Table 2.

TABLE 2

Two-stage hydrotreatment with inter-stage separation of a DNS grade quality rape oil

| Feed | T = 320° C. P = 4 MPa | T = 300° C. P = 4 MPa | T = 300° C. P = 2.5 MPa | T = 280° C. P = 2.5 MPa |
|---|---|---|---|---|
| Triglycerides conversion |  |  |  |  |
| (C=O bond of the ester IR band at 1751 cm$^{-1}$) | 100% | 100% | 100% | <100% |
| H$_2$ consumption |  |  |  |  |
| (% weight/feed) | 5.7 | 4.8 | 3.7 | not measured |
| Yields (% weight/feed) |  |  |  |  |
| CO | 0.4 | 0.6 | 0.8 | not measured |
| CO$_2$ | 5.3 | 6.4 | 7.8 |  |
| H$_2$O | 12.2 | 10.2 | 7.5 |  |
| C$_3$ | 1.5 | 1.5 | 1.5 |  |

It can be observed that, during hydrotreatment of a feed consisting of DNS quality rape oil at 320° C. under 4 MPa (not according to the invention), the hydrogen consumption is very high since it is 5.7% by weight in relation to the feed.

Besides, the production of water represents between 7.5 and 12.2% by weight of the feed according to the operating conditions, which leads to an acceleration of the phenomena of sintering of hydrotreating catalyst supports such as alumina.

The decrease of the temperature to 300° C. and the pressure decrease allow to lower this consumption to 4.8, then to 3.7% by weight by favouring decarboxylation and decarbonylation reactions in relation to the hydrodeoxygenation reaction. Thus, it is more advantageous in cases where the feed contains vegetable oils to operate at lower temperatures and pressures than those commonly used in the case of gas oil hydrotreatment in order to reduce the hydrogen consumption of the method.

Example 3

Analysis of the Used Catalysts Used in Examples 1 and 2

The used catalysts described in Example 1 for a feed consisting of a hydrocarbon cut that contains no vegetable oil and for a feed comprising 15% vegetable oil were analyzed.

The results of the elementary analyses of these catalysts after toluene reflux washing and 1-hour drying in a vacuum drier are given in Table 3. It can be observed that the introduction of rape oil in the feed accelerates coking of the catalyst used and that the S/Mo ratio that characterizes the stability of the sulfide phase decreases. Aging of the catalyst is thus accelerated by the presence of vegetable oil in comixture.

The specific surface area of these used catalysts was also measured by means of the BET method. It was observed that the introduction of rape oil in the feed leads to a decrease in the specific surface area of the used catalysts.

The characteristics of the used catalyst described in Example 2 are also given in Table 3. It can be seen that the trends observed for the hydrotreatment of a feed containing 15% rape oil are confirmed when a feed consisting of pure rape oil is used. Thus, the carbon content of the used catalyst of Example 2 is 4.9% by weight, its S/Mo ratio is still lower than that of the used catalysts of Example 1 and the BET surface area is 141 m²/g.

TABLE 3

Elementary analyses and specific surface area of the used catalysts after hydrotreatment of a hydrocarbon feed, of a feed containing 15% rape oil in a single stage and of a feed consisting of rape oil alone

| Illustrated example | % wt rape oil in the mixture | C (% by weight) | H (% by weight) | S/Mo (molar ratio) | $S_{BET}$ (m²/g) |
|---|---|---|---|---|---|
| 1 | 0 | 2.4 | 1.2 | 1.87 | 189 |
| 1 | 15 | 3.1 | 1.3 | 1.64 | 173 |
| 2 | 100 | 4.9 | 1.2 | 0.73 | 141 |

Example 4

Effect of Hydrogen on the Inhibition of the Formation of Polymers Upon Heating in Comixture of the Vegetable Oils and of the Petroleum Feed (Comparative Example)

Heating a straight-run gas oil with a rape oil was carried out in an oven containing 50 cc glass marbles in dense loading.

The petroleum feed used has the same characteristics as those described in Example 1.

After heating to 200° C. in the oven for 20 6-min heating cycles (total heating time: 2 h), the polymer content of the effluent is measured by means of the normalized NF ISO EN 16931 method allowing, by gel permeation chromatography, to quantify the polymer content after the enrichment stage.

After heating, it is observed that the triglyceride polymer concentration represents 14% of the feed if the oil is heated alone; 2.1% of the feed in case of heating of a gas oil/vegetable oil comixture (85/15) and less than 0.2% in case of heating in the presence of hydrogen, corresponding to the embodiment of the method according to the invention. The polymer contents of the effluents obtained are given in Table 4.

TABLE 4

Polymer content obtained according to the vegetable oil heating mode

| | Pure vegetable oils | Straight-run gas oil in comixture with rape oil (85/15% by weight) | Straight-run gas oil in comixture with rape oil (85/15% by weight) |
|---|---|---|---|
| Presence of hydrogen | No | No | Yes |
| Temperature (° C.) | 20 6-min cycles @ 200° C. | 20 6-min cycles @ 200° C. | 20 6-min cycles @ 200° C. |
| Polymer content (% wt/ feed) (NF ISO EN 16931) | 14.1% | 2.1% | <0.2% |

It can thus be noted that the presence of hydrogen associated with the dilution in a petroleum feed of gas oil type favours the reduction of polymer formation. This reduction is more significant than a simple dilution effect.

Thus, quench introduction of the vegetable oil in a gas oil under partial hydrogen pressure represents a significant gain for the limitation of polymer formation.

Example 5

Hydrotreatment in Two Stages of a Hydrocarbon Feed with Introduction of Rape Oil Before the Second Reaction Section (According to the Invention)

The first stage consists in hydrotreating the hydrocarbon feed described in Example 1 at 350° C. under 4 MPa on a NiMo/alumina catalyst (50 cc). Stripping of the effluents is then performed so as to eliminate the H₂S and the NH₃ produced during this final hydrodesulfurization stage. Distillation of the stripped feed is then carried out and the fraction boiling above 250° C. is mixed with the rape oil in a variable proportion and sent to a second pilot plant dedicated to mild hydrotreatment. This second pilot plant is operated at 300° C. under 2.5 MPa on a CoMo catalyst (50 cc). The characteristics of the effluents at the outlet of this second pilot plant are given in Table 5.

TABLE 5

Hydrotreatment in two stages of a mixture of rape oil and of straight-run gas oil

| Feed | Pure straight-run gas oil | Straight-run gas oil in comixture with rape oil (95/5% wt) | Straight-run gas oil in comixture with rape oil (85/15% wt) | Pure straight-run gas oil (return point) |
|---|---|---|---|---|
| Conditions Catalyst age (h) | 128 | 265 | 409 | 513 |
| Density | | | | |
| feed/effluents (kg/m$^3$) | 853.7/838.0 | 861.1/836.8 | 857.2/834.2 | 853.7/837.8 |
| Sulfur | | | | |
| feed/effluents (mg/kg) | 13500/7 | 12950/9 | 11967/13 | 13500/7 |
| Nitrogen | | | | |
| feed/effluents (mg/kg) | 126/3 | 116/4 | 113/5 | 126/3 |
| H$_2$ consumption (% weight/feed) | 0.43 | 0.47 | 0.48 | 0.42 |
| Cetane | | | | |
| feed HDS1 | 56.6 | 56.6 | 56.6 | 56.6 |
| effluent HDT2 | 59.5 | 61.3 | 65.2 | 59.1 |
| Cold properties feed/effluent | | | | |
| Cold filter-plugging point (° C.) | −3/−2 | −3/−2 | −1/0 | −3/−2 |
| Cloud point (° C.) | +2/+1 | 0/0 | +0/+1 | +2/+2 |

Analysis of the effluent products shows that the method according to the invention allows to obtain effluents with a higher cetane number in relation to the single-stage method of Example 1 (not according to the invention).

The cold properties remain greatly improved in relation to those of the initial vegetable oil (CFPP of about 20° C.) or of the effluent resulting from the hydrotreatment only of the vegetable oil (CFPP of 20° C. also).

Concerning the effluent sulfur contents, it can be observed that in the case of the method according to the invention the effluent sulfur contents are below or very close to the 10 mg/kg limit imposed by the new European specifications in 2009. The single-stage method of Example 1 (not according to the invention) led to gas oils having effluent sulfur contents greater than or equal to 400 mg/kg.

In conclusion, the effluents obtained according to the method of the invention represent a very significant improvement for integration of the effluents in the gas oil pool meeting the sulfur specifications.

Example 6

Analysis of the Used Catalysts Used in the Case of Example 3 (According to the Invention)

As before, the catalysts used in the first and in the second catalyst bed were analyzed after the tests. The values obtained are given in Table 6.

TABLE 6

Elementary analysis and specific surface area of the used catalysts after hydrotreatment carried out according to the method of the invention

| wt % rape oil in the mixture | Initial stage of the catalyst | C (% by weight) | H (% by weight) | S/Mo (molar ratio) | $S_{BET}$ (m$^2$/g) |
|---|---|---|---|---|---|
| 0 | 1 | 2.4 | 1.2 | 1.87 | 185 |
| 0 | 2 | 2.1 | 1.0 | 1.93 | 187 |
| 5 | 2 | 2.6 | 1.3 | 1.87 | 186 |
| 15 | 2 | 2.8 | 1.4 | 1.84 | 185 |

By comparison with Example 3, it can be observed that co-treatment of the hydrocarbon cut with the vegetable oil leads to an S/Mo molar ratio that is closer to the stoichiometry of the MoS$_2$ compound, which shows that the pure vegetable oil destabilizes the active phase and therefore the stability and the life of the sulfide catalyst. On the other hand, by comparison between the used catalysts of stage 2, it is observed that the mild hydrotreatment catalyst (stage 2) is preserved by the method according to the invention, in particular as regards carbon deposits, which allows to obtain effluent sulfur contents in accordance with the specifications on the one hand and which provides, on the other hand, a longer cycle time with the same catalyst while limiting the hydrogen consumption.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French application No. 06/11408, filed Dec. 22, 2006 are incorporated by reference herein.

The invention claimed is:

1. A method of hydrotreating a feed of a mixture comprising an oil of vegetable or animal origin (1 to 99% by volume) and of a petroleum cut (99 to 1% by volume) so as to obtain a fuel base at least containing less than 50 mg/kg sulfur, comprising:
   a) a first hydrotreatment stage of a petroleum cut in a fixed-bed section HDS1 with at least one catalyst at a temperature of 180° C. to 450° C., a total pressure of 0.5 to 30 MPa, an hourly space velocity of 0.1 to 20 $h^{-1}$ and in the presence of 50 to 2000 Nl hydrogen per liter of feed to obtain an effluent,
   b) a quench introduction of a stream of oils of vegetable or animal origin so as to form a resultant mixture with at least part of the effluent from HDS1,
   c) a second hydrotreatment stage of the resultant mixture in a fixed-bed section HDT2 with at least one catalyst at a temperature of 180° C. to 360° C., a total pressure of 0.5 to 20 MPa, an hourly space velocity of 0.1 to 20 $h^{-1}$ and in the presence of 50 to 2000 Nl hydrogen per liter of feed.

2. A method as claimed in claim 1, wherein stage a) is operated at a temperature ranging between 250° C. and 440° C., at a pressure ranging between 1 and 25 MPa and at a space velocity of 0.2 to 4 $h^{-1}$.

3. A method as claimed in claim 1, wherein stage b) is operated at a temperature ranging between 190° C. and 350° C., at a pressure ranging between 1 and 10 MPa, and at a space velocity of 0.2 to 5 $h^{-1}$.

4. A method as claimed in claim 1, wherein each stage comprises one or more reactors and/or one or more catalyst beds.

5. A method as claimed in claim 1, wherein said mixture to treated in section HDT2 comprises 1 to 50% oil of vegetable or animal origin and of 99 to 50% petroleum cut.

6. A method as claimed in claim 1, wherein said oil is a vegetable oil comprising predominantly fatty acids in the form of triglycerides having long alkyl chains comprising 8 to 24 carbon atoms.

7. A method as claimed in claim 6, wherein the vegetable oil is selected from among the following oils: rape, erucic rape, soybean, sunflower or oleic sunflower, palm, copra and palm-nut oil, or a mixture of these oils and derivatives thereof.

8. A method as claimed in claim 1, wherein the petroleum cut is a hydrocarbon fraction having a boiling point between 130° C. and 410° C.

9. A method as claimed in claim 8, wherein the hydrocarbon fraction comprises a gas oil or diesel cut.

10. A method as claimed in claim 8, wherein the hydrocarbon fraction is a gas oil cut obtained from straight distillation, catalytic cracking from coking, visbreaking or hydroconversion of residues.

11. A method as claimed in claim 1, wherein the hydrotreatment catalyst comprises at least one metal from group VIB and/or at least one metal from group VIII of the periodic table of elements.

12. A method as claimed in claim 11, wherein the catalyst comprises a cobalt-molybdenum (CoMo), nickel-molybdenum (NiMo) or nickel-tungsten (NiW) pair.

13. A method as claimed in claim 11, wherein the catalyst further comprises phosphorus, boron and/or fluorine.

14. A method as claimed in claim 1, wherein each stage uses an identical or different catalyst.

15. A method as claimed in claim 1, wherein the oils of vegetable or animal origin are incorporated in at least part of the effluent from the hydrodesulfurization plant under partial hydrogen pressure.

16. A method as claimed in claim 15, wherein the hydrogen is make-up hydrogen and/or recycle hydrogen from the first fixed bed section.

17. A method as claimed in claim 1, wherein direct heat transfer is conducted between the effluents of the first fixed bed section and said oils in the presence of hydrogen.

18. A method as claimed in claim 1, wherein the hydrogen in stage c) comprises a proportion ranging from 1 to 100% by volume, of recycle hydrogen from the first fixed bed section HDS1.

* * * * *